(12) United States Patent
De Saulles et al.

(10) Patent No.: US 10,390,612 B2
(45) Date of Patent: Aug. 27, 2019

(54) STOWABLE TABLE

(71) Applicant: FORD GLOBAL TECHNOLOGIES, LLC, Dearborn, MI (US)

(72) Inventors: Stephen De Saulles, London (GB); Marcus Hoggarth, Hertfordshire (GB)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 15/333,344

(22) Filed: Oct. 25, 2016

(65) Prior Publication Data

US 2017/0112274 A1 Apr. 27, 2017

(30) Foreign Application Priority Data

Oct. 27, 2015 (GB) .................................. 1518953.3

(51) Int. Cl.
*A47B 13/16* (2006.01)
*B60N 3/00* (2006.01)
(Continued)

(52) U.S. Cl.
CPC ................ *A47B 13/16* (2013.01); *A47B 3/00* (2013.01); *B60N 3/001* (2013.01); *B60N 3/002* (2013.01);
(Continued)

(58) Field of Classification Search
CPC .......... A47B 13/16; A47B 3/00; B60N 3/001; B60N 3/10; B60N 3/002; B60N 3/004; B60N 3/102
(Continued)

(56) References Cited

U.S. PATENT DOCUMENTS 4,756,572 A   7/1988   Dykstra et al.
5,018,633 A * 5/1991   Toth ...................... B60N 3/102
                                                        224/483
(Continued)

FOREIGN PATENT DOCUMENTS

DE        19546543 A1    6/1997
DE     102010008718 A1   11/2010
(Continued)

OTHER PUBLICATIONS

Great Britain Combined Search and Examination Report for Great Britain Application No. 1518953.3 dated Apr. 19, 2016.
(Continued)

*Primary Examiner* — Janet M Wilkens
*Assistant Examiner* — Timothy M Ayres
(74) *Attorney, Agent, or Firm* — Vichit Chea; Brooks Kushman P.C.

(57) ABSTRACT

A stowable table includes a table portion movable between a horizontal deployed position and a non-horizontal stowed position. The table portion may be configured to be stowed in a receiving structure. A holder may be configured to receive a liquid receptacle and rotatably coupled to the table portion about a pivot axis. The holder may also be slidably coupled to the table portion and slidable between a setback position in which the pivot axis is set back from an end of the table portion when the table portion is in the deployed position, and an aligned position in which the pivot axis is substantially aligned with the table portion end when in the stowed position.

2 Claims, 4 Drawing Sheets

(51) Int. Cl.
B60N 3/10 (2006.01)
A47B 3/00 (2006.01)

(52) U.S. Cl.
CPC ............... B60N 3/004 (2013.01); B60N 3/10 (2013.01); B60N 3/102 (2013.01)

(58) Field of Classification Search
USPC ................. 108/26, 42–46; 312/319.3–319.4
See application file for complete search history.

(56) References Cited

U.S. PATENT DOCUMENTS

| | | | | | |
|---|---|---|---|---|---|
| 5,171,061 | A | * | 12/1992 | Marcusen | B60N 3/102 297/188.17 |
| 5,297,767 | A | * | 3/1994 | Miller | A47C 7/70 224/275 |
| 5,601,269 | A | * | 2/1997 | Jankovic | B60N 3/102 224/281 |
| 5,692,718 | A | * | 12/1997 | Bieck | B60N 3/102 224/281 |
| 6,234,438 | B1 | * | 5/2001 | Plocher | B60N 3/102 224/926 |
| 6,279,992 | B1 | * | 8/2001 | Plocher | B60N 3/004 297/146 |
| 6,347,590 | B1 | * | 2/2002 | D'Annunzio | B60N 3/002 108/25 |
| 6,409,061 | B1 | * | 6/2002 | Fischer | B60N 3/102 224/281 |
| 7,201,439 | B2 | * | 4/2007 | Schweizer | A47C 7/70 108/38 |
| 8,881,659 | B2 | * | 11/2014 | Ackeret | B60N 3/002 108/44 |
| 2015/0097406 | A1 | * | 4/2015 | Tanaka | B60N 2/5816 297/378.1 |

FOREIGN PATENT DOCUMENTS

| | | |
|---|---|---|
| KR | 20020049403 A | 6/2002 |
| WO | 0192055 A1 | 12/2001 |

OTHER PUBLICATIONS

Extended European Search Report for European Application No. 16191545.9 dated Mar. 8, 2017.

\* cited by examiner

STOWABLE TABLE

CROSS-REFERENCE TO RELATED APPLICATIONS

This application claims foreign priority benefits under 35 U.S.C. § 119(a)-(d) to GB 1518953.3 filed Oct. 27, 2015, which is hereby incorporated by reference in its entirety.

TECHNICAL FIELD

This disclosure relates generally to a stowable table that may include a table portion and a cup holder that is rotatable and slidable with respect to the table portion.

BACKGROUND

It is known to provide stowable tables that move between a horizontal position in which the table may be used and a stowed position. Such tables may also comprise a recess in the table for receiving a cup or similar receptacle. The recess may however only function when the table is in the horizontal position. It is desirable to provide a cup holder that is capable of receiving a cup in both the horizontal and stowed positions.

SUMMARY

According to an aspect of the present disclosure, there is provided a stowable table comprising: a table portion movable between a horizontal deployed position and a non-horizontal (e.g. vertical) stowed position, the table portion being configured to be stowed in a receiving structure; and a holder configured to receive a liquid containing receptacle, wherein the holder is rotatably coupled to the table portion about a pivot axis. The holder may be slidably coupled to the table portion and slidable between a set back position in which the pivot axis is set back from an end of the table portion when the table portion is in the deployed position and an aligned position in which the pivot axis is adjacent to the table portion end when in the stowed position.

In one embodiment, a stowable table includes a table portion movable between stowed and deployed positions, a weight movable relative to the table portion, and a cup holder coupled to the table portion and the weight, the cup holder pivoting to remain substantially horizontal and sliding to move toward an edge of the table portion as the table moves between the stowed and deployed positions and the weight moves away from the edge.

In various embodiments a stowable table includes a table portion movable between a deployed horizontal position and a stowed non-horizontal position and a holder pivotally and slidably coupled to the table portion by a rack and pinion and configured to receive a liquid receptacle in both the deployed and stowed positions. The holder moves to be generally aligned with the table portion when deployed and generally perpendicular to the table portion when stowed.

The stowable table may further comprise a carrier to which the holder may be rotatably coupled about the pivot axis. The carrier may be slidably coupled to the table portion.

The stowable table may further comprise a first resilient element configured to bias the holder (e.g. via the carrier) to the set back position.

The stowable table may further comprise a first weighted portion configured to bias the holder (e.g. via the carrier) to the aligned position when the table portion is in the stowed position, e.g. by virtue of gravity. The first weighted portion may be coupled to the holder (e.g. via the carrier) by virtue of a flexible member and a pulley. Alternatively, the first weighted portion may be coupled to the holder (e.g. via the carrier) by virtue of a rack and pinion mechanism. The rack and pinion mechanism may comprise a first rack coupled to the first weighted portion, a second rack coupled to the holder (e.g. via the carrier) and a pinion gear provided between the first and second racks.

The table portion may be configured to rotate from the deployed position and subsequently slide into the receiving structure. The stowable table may be configured such that an interaction with the receiving structure may cause the holder to move from the set back position to the aligned position. For example, the holder may be resiliently biased to the set back position (e.g. the first weighted portion may not be required) and the holder may be moved to the aligned positon by the interaction with the receiving structure into which table portion is stowed. The table portion may be latched or locked into place in the receiving structure.

The stowable table may further comprise a first actuator configured to move the holder (e.g. via the carrier) between the set back and aligned positions.

The holder may rotate between the deployed and stowed positions. The holder may comprise a second weighted portion spaced apart from the pivot axis such that gravity may bias the holder into an upright position. Additionally or alternatively, the stowable table may further comprise a second actuator configured to maintain the holder in an upright position.

The holder may be flush with the table portion when in the deployed position. For example, an edge of the holder may be aligned with the end of the table portion when the pivot axis is in the set back position and the table portion is in the deployed position.

The holder may be flush with the receiving structure when the table portion is in the stowed position. For example, a top of the holder may be aligned with a surface of the receiving structure when the pivot axis is in the aligned position and the table portion is in the stowed position.

A trim portion (e.g. a door trim) of a vehicle (e.g. a motor vehicle) may comprise the receiving structure.

A stowable table assembly may comprise the above-mentioned stowable table and receiving structure.

A vehicle may comprise the above-mentioned stowable table or stowable table assembly.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the claimed subject matter, and to show more clearly how it may be carried into effect, reference will now be made, by way of example, to the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1A:
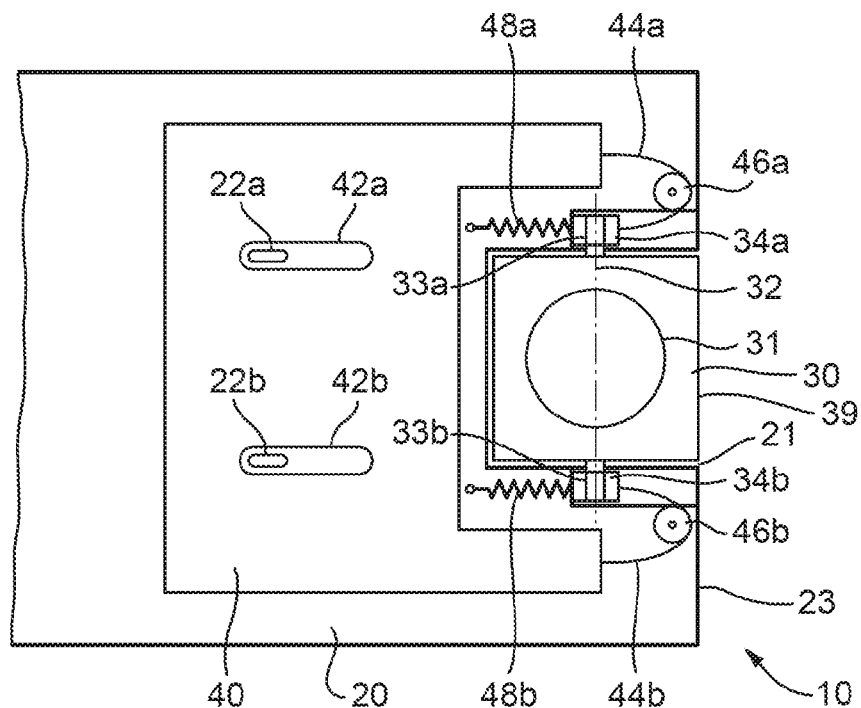
FIGS. 1A and 1B are schematic cut-away views showing a table according to a first arrangement of the present disclosure with FIG. 1A showing a configuration of the table in a horizontal deployed position and FIG. 1B showing a side view configuration of the table in a vertical stowed position.
Figure 1B:
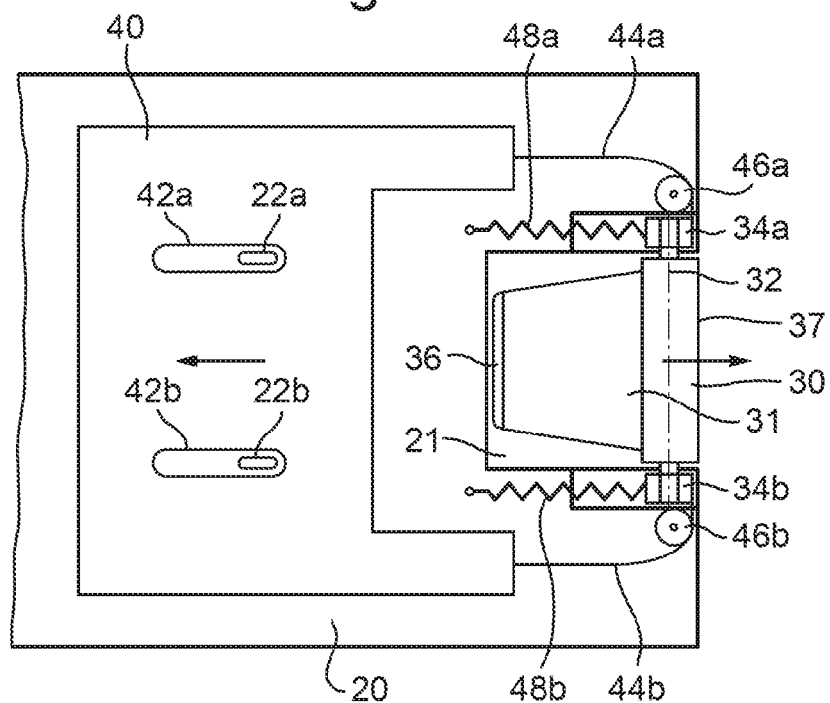

With reference to FIGS. 1A, 1B, 4A and 4B, a table 10 according to a first arrangement of the present disclosure is shown. The table 10 comprises a table portion 20 and a holder 30. The table 10 may move between a deployed position in which the table portion 20 is substantially horizontal to a stowed position in which the table portion 20 may be non-horizontal, e.g. vertical. FIG. 1A depicts a deployed configuration of the table, whereas FIG. 1B depicts a stowed configuration of the table. The table portion 20 may be substantially planar and may comprise a top surface 24 upon which items may be placed. The table portion 20 may further comprise a bottom surface 25. The mechanism depicted in FIGS. 1A and 1B may be located in a space within the table portion between the top and bottom surfaces 24, 25.

The holder 30 may be configured to hold a fluid containing receptacle such as a cup, mug, bottle, beaker, can, glass or any other such receptacle. Accordingly, the holder 30 may comprise a recess 31 in which the fluid containing receptacle may be placed. The holder 30 may be rotatably coupled to the table portion 20 about a pivot axis 32. First and second shaft portions 33a, 33b may extend from the holder 30 into respective carrier portions 34a, 34b. The first and second shaft portions 33a, 33b may be aligned with the pivot axis 32. The first and second carrier portions 34a, 34b may comprise openings, which receive the respective shaft portions 33a, 33b such that the shaft portions may rotate within the carrier portion openings. The first and second carrier portions 34a, 34b may slide in respective tracks provided within the table portion 20.

The table 10 may further comprise a first weighted portion 40. The first weighted portion 40 may be configured to slide within the table portion 20. The first weighted portion 40 may comprise one or more slots 42a, 42b, which may receive one or more guides 22a, 22b of the table portion 20. The guides 22a, 22b may extend between the top and bottom surfaces 24, 25 of the table. The first weighted portion 40 may be constrained to slide by virtue of the interaction between the slots 42a, 42b and respective guides 22a, 22b.

The first weighted portion may be operatively connected to the first and second carrier portion 34a, 34b. For example, in the first arrangement shown in FIGS. 1A and 1B, the first weighted portion 40 is coupled to the first and second carrier portions 34a, 34b by virtue of first and second flexible members 44a, 44b, which are disposed around respective pulleys 46a, 46b. The flexible members 44a, 44b may be in the form of a wire, string, cord or any other such flexible member. The pulleys 46a, 46b may be rotatably coupled to the table portion 20 or they may be rigidly coupled to the table portion 20 with the flexible members simply sliding over the pulley surfaces. In either case, movement of the first weighted portion 40 in a first direction may cause the carrier portions 34a, 34b to slide in a second opposite direction.

Movement of the carrier portions 34a, 34b may be resisted by first and second resilient elements 48a, 48b, which may resist movement of the carrier portions 34a, 34b in the second direction (e.g. to bias the carrier portions 34a, 34b into the position shown in FIG. 1a). One end of the resilient elements 48a, 48b may be coupled to the table portion 20, whilst another end of the resilient elements may be coupled to the respective carrier portions 34a, 34b. By way of example, the resilient elements 48a, 48b may be in the form of a spring or any other such biasing means.

As depicted in FIG. 1B, the holder 30 may comprise a second weighted portion 36, which may be provided at or towards the bottom of the holder 30. The second weighted portion 36 may therefore be spaced apart from the pivot axis 32. The weight of the second weighted portion 36 may be selected to ensure that the centre of gravity of the combined holder 30 and liquid containing receptacle with liquid therein is below the pivot axis 32. As a result, when the table is rotated between the stowed and deployed positions, the second weighted portion 36 may serve to maintain the holder 30 in an upright position. This may reduce the likelihood of a liquid in the fluid containing receptacle in the holder 30 spilling as the table rotates between the stowed and deployed positions.

The table portion 20 comprises a recess 21 provided at a distal end 23 of the table portion. The recess 21 is sized and shaped and sized so as to receive the holder 30. Outside of the holder recess 31, the holder 30 may comprise a top surface 37, which may fit in the table portion recess 21 and be substantially flush with the top surface of the table portion 20 when in the deployed position. Similarly, an edge 39 of the holder 30 may be substantially flush with the distal end 23 of the table portion 20 when in the deployed position. Although FIG. 1A shows the holder top 37 being substantially square, it is also envisaged that the top of the holder 30 may be any other shape, e.g. rectangular.

Figure 4A:
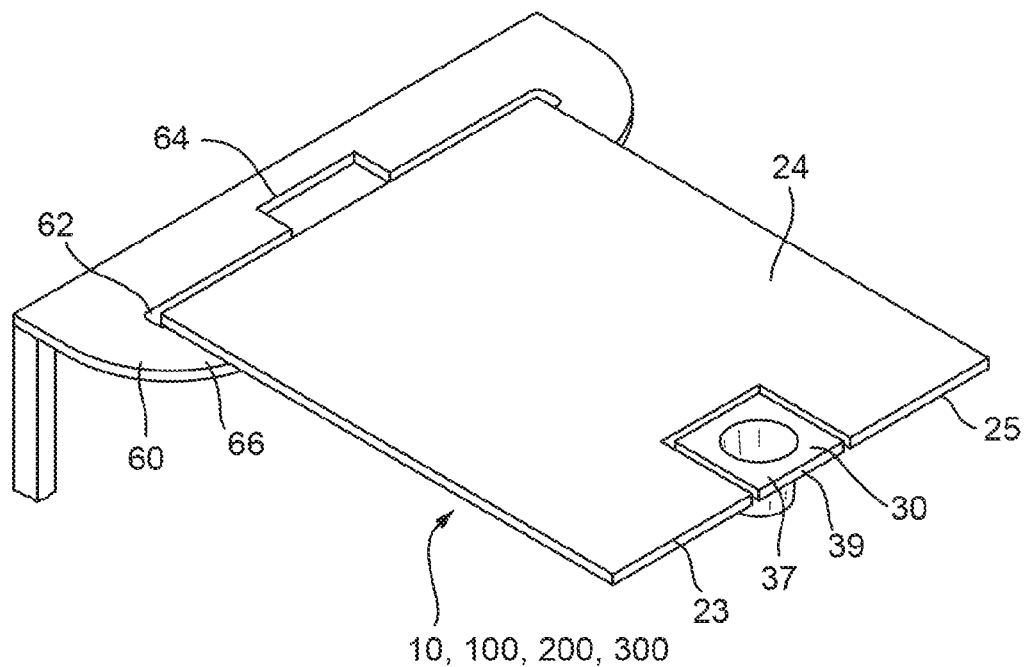
FIGS. 4A and 4B are perspective views showing the table of any of the arrangements of the present disclosure with FIG. 4A showing the table in a horizontal deployed position and FIG. 4B showing the table in a vertical stowed position.
Figure 4B:
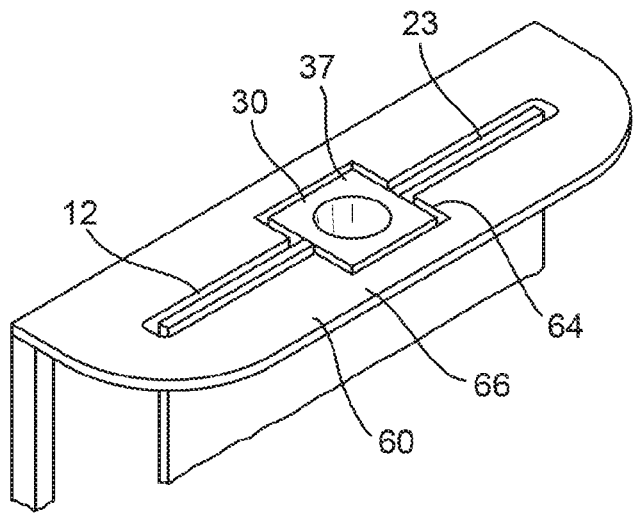

With reference to FIGS. 1B and 4B, as the table is moved from the deployed position to the stowed position, the first weighted portion 40 will tend to slide downwards by virtue of gravity. By contrast, the carrier portions 34a, 34b will move upwards by virtue of the flexible members 44a, 44b, which may be at least partially wrapped round the pulleys 46a, 46b. At the same time the holder 30 may rotate by virtue of the gravity acting on the second weighted portion 36, thereby maintaining the holder 30 in an upright position. As depicted in FIG. 1B, the pivot axis 32 of the holder 30 may then be adjacent to the distal end 23 of the table portion 20, for example with the holder top 37 being substantially in line with the table portion distal end 23. By contrast, in the deployed position shown in FIGS. 1A and 4A, the pivot axis 32 is set back from the distal end 23 of the table portion 20.

To avoid a bottom of the holder 30 hitting an end of the table portion recess 21, the depth of the holder 30 may be less than or equal to a depth of the table portion recess 21. Accordingly, the depth of the holder 30 may be less than or equal to a length of the holder top surface 37 (perpendicular to the pivot axis 32), which fits in the table portion recess 21.

The mass of the first weighted portion 40 may be selected so that its weight exerts a force that is greater than the combined weight of the carrier portions 34a, 34b, the holder 30, the maximum anticipated weight of the liquid container and liquid therein and the restoring force exerted by resilient elements 48a, 48b.

When the table 10 is moved from the stowed position to the deployed position, the resilient elements 48a, 48b may act on the carrier elements 34a, 34b so as to move the carrier elements in the first direction and thus the first weighted portion 40 in the second direction (e.g. to return the components to the positions depicted in FIG. 1A). The resilience of the first and second resilient elements 48a, 48b may be selected such that it is sufficient to move the first weighted portion 40 in the second direction when the table is not in an upright position, e.g. when the component of the gravity force acting on the first weighted portion 40 in the direction in which it may slide has been reduced.

The movement of the first and second carrier portions 34a, 34b may be limited by the distal end wall of the table portion 20 at one end and by one or more abutments provided at the opposite end of the range of movement for the carrier portions 34a, 34b. Similarly, movement of the first weighted portion 40 may be limited by the interaction between the guides 22a, 22b and the respective slots 42a, 42b.

In an alternative arrangement (not depicted), the carrier portions 34a, 34b may be omitted. The flexible members 44a, 44b may then connect directly to the shaft portions 33a, 33b. The shaft portions 33a, 33b may be constrained to slide relative to the table portion 20. Similarly, the resilient elements 48a, 48b may also connect directly to the shaft portions 33a, 33b.

Again, in an alternative arrangement (not depicted), the first and second carrier portions 34a, 34b may be connected to one another. For example, the carrier portions may be connected via a connecting member which together extend around the recess 21, e.g. forming a u-shaped member.

Figure 2A:
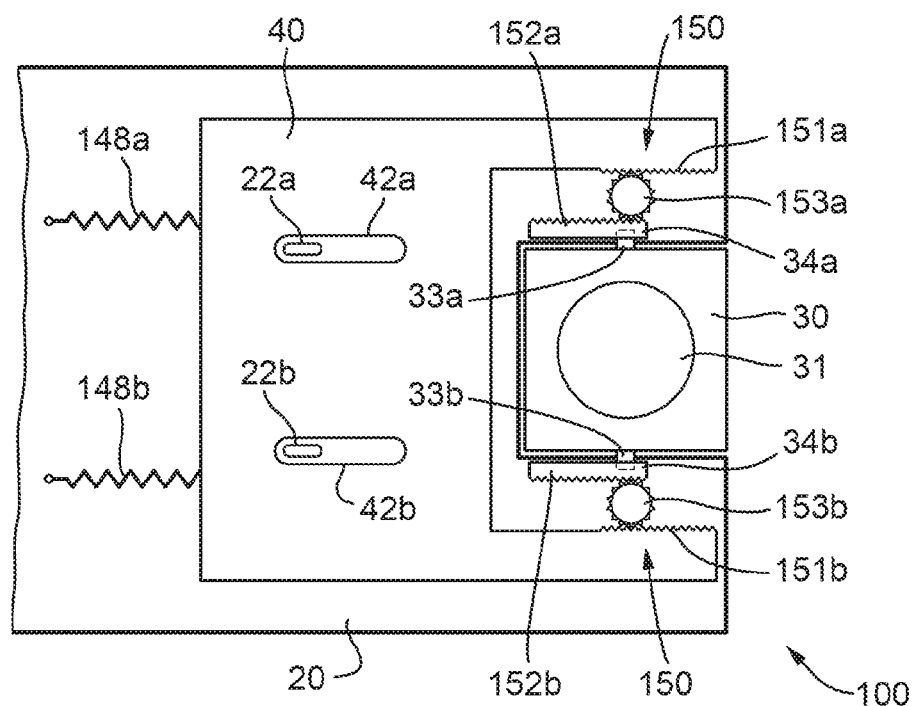
FIGS. 2A and 2B are schematic cut-away views showing a table according to a second arrangement of the present disclosure with FIG. 2A showing a configuration of the table in a horizontal deployed position and FIG. 2B showing a side view configuration of the table in a vertical stowed position.
Figure 2B:
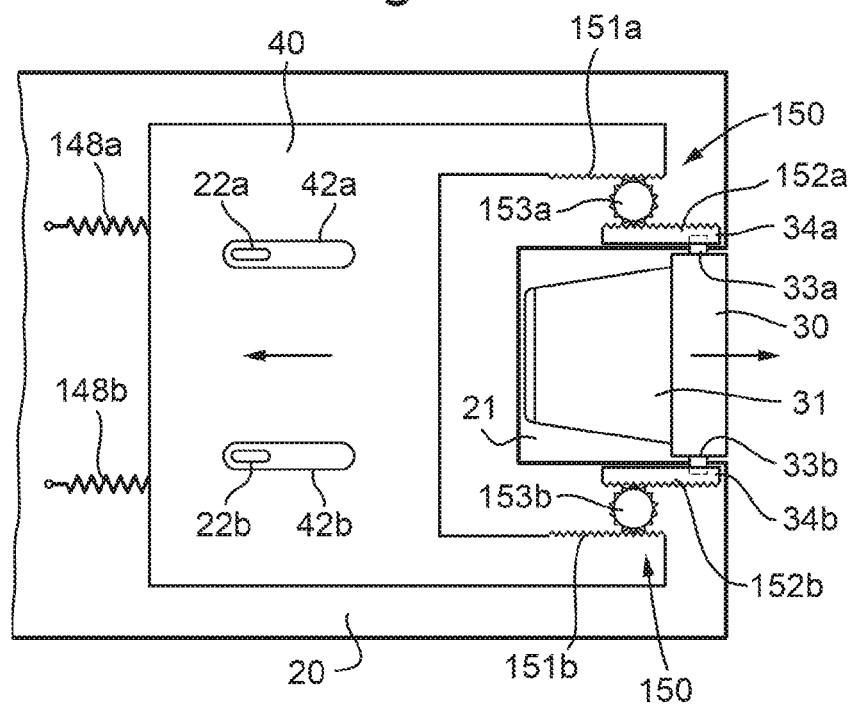

With reference to FIGS. 2A and 2B, a table 100 according to a second arrangement of the present disclosure comprises a rack and pinion mechanism 150 in place of the pulleys and flexible members of the first arrangement. The rack and pinion mechanism 150 comprises one or more first racks 151a, 151b, which are coupled to the first weighted portion 40. The rack and pinion mechanism 150 further comprises one or more second racks 152a, 152b, which are coupled to the holder 30 via the respective carrier portions 34a, 34b. The rack and pinion mechanism 150 further comprises one or more pinion gears 153a, 153b, which are provided between the first and second racks. Teeth on the first rack 151a, 151b engage teeth on the pinion gear 153a, 153b, which in turn engage teeth on the second rack 152a, 152b. As a result, movement of the first weighted portion 40 in the first direction causes the second rack 152a, 152b and thus the holder 30 to move in the second direction, which is opposite to the first direction and vice versa.

Although a pair of first racks 151a, 151b, gears 153a, 153b and second racks 152a, 152b are shown, it is equally envisaged that a single first rack, gear and second rack may be provided. For example, as mentioned above, the carrier portions 34a, 34b may be connected to one another and a single rack and gear mechanism may act on the connected carrier portions.

Resilient elements 148a, 148b may act on the first weighted portion 40 to bias the components into the deployed configuration depicted in FIG. 2A. Alternatively, as for the first arrangement, resilient elements may act on the carrier portions 34a, 34b. However, in the second arrangement shown in FIGS. 2A and 2B the resilient elements 148a, 148b may be configured so as to push against the weighted member 40. By contrast, the resilient elements 48a, 48b of the first arrangement may be biased so as to pull on the carrier portions 34a, 34b.

The table 100 of the second arrangement is otherwise identical to the table 10 of the first arrangement described above and features described in relation to the first arrangement will not be repeated here.

Figure 3A:
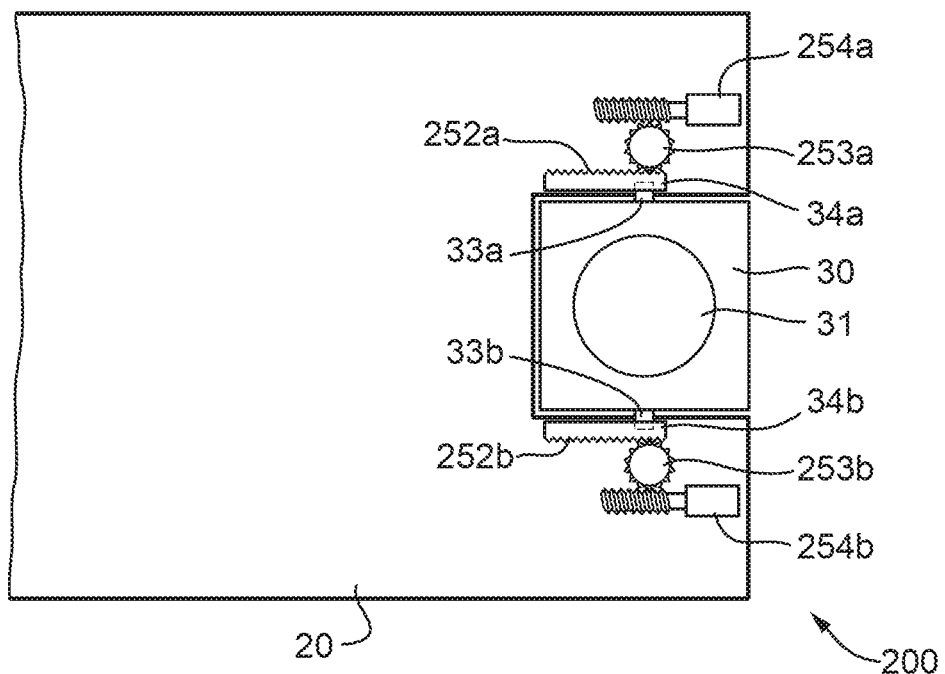
FIGS. 3A and 3B are schematic cut-away views showing a table according to a third arrangement of the present disclosure with FIG. 3A showing a configuration of the table in a horizontal deployed position and FIG. 3B showing a side view configuration of the table in a vertical stowed position.
Figure 3B:
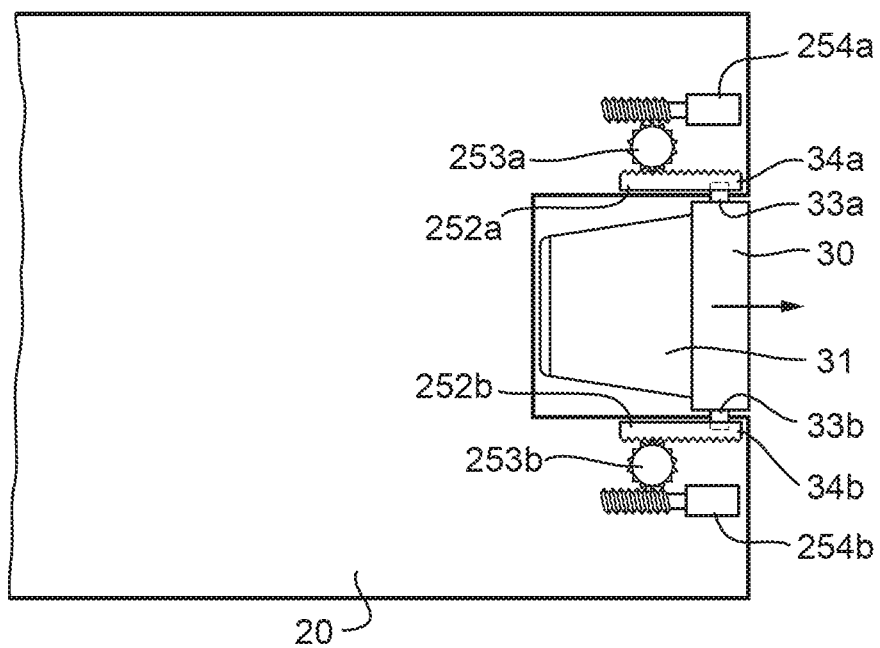

With reference to FIGS. 3A and 3B, a table 200 according to a third arrangement of the present disclosure will be described. The table 200 may be substantially similar to the table 100 described above in relation to the second arrangement of the present disclosure except that the first weighted portion 40 and the first rack 151a, 151b may be omitted. Instead, the table 200 may comprise one or more actuators, e.g. in the form of motors 254a, 254b, which drive a gear 253a, 253b, which in turn drives the second rack 252a, 252b. As for the second arrangement described above, the second rack 252a, 252b may be connected to or part of the carrier portions 34a, 34b.

Although a pair of racks 252a, 252b, gears 253a, 253b and motors 254a, 254b are shown, it is equally envisaged that a single motor and rack and gear mechanism may be provided. For example, as mentioned above, the carrier portions 34a, 34b may be connected to one another and a single motor, rack and gear may act on the connected carrier portions.

A sensor (not shown) may be provided to determine the inclination of the table 200. If the sensor determines that the table is in a horizontal position, a controller (not shown) may instruct the actuator to move the carrier portions 34a, 34b into the set back position (shown in FIG. 3A). By contrast if the sensors determine that the table is moving towards the vertical position, the actuator may move the carrier portions 34a, 34b into the aligned position (shown in FIG. 3B). The third arrangement is otherwise identical to the first and second arrangements described above and features described in relation to these arrangements will not be repeated here.

Referring now to FIGS. 4A and 4B, perspective views of the tables 10, 100, 200, 300 described above are shown in the deployed and stowed positions respectively. FIG. 4A shows the table in a substantially horizontal position. The table may protrude from a structure 60 which comprises a slot 62 for receiving the table in the stowed position as depicted in FIG. 4B. The table may comprise a mechanism (not shown) that permits the table to rotate from the horizontal position and that allows the table to slide into the slot 62 of the structure 60. The slot 62 may comprise a holder receiving portion 64 which is shaped to receive the holder 30 of the table. With any of the above described arrangements, the holder 30 may maintain an upright position as the table is rotated. The holder 30 also slides relative to the table portion such that the top surface 37 of the holder may be flush with a top surface 66 of the structure 60 when in the stowed position. As a result the holder 30 may serve as a holder for a liquid containing receptacle when the table is both in the deployed position as shown in FIG. 4A and in the stowed position as shown in FIG. 4B.

In a further alternative arrangement (not shown), the various mechanisms described above which are configured to slide the holder relative to the table portion may be omitted. Instead, the holder may be moved to the flush position depicted in FIG. 4B by virtue of an interaction between the holder and the structure 60. For example, the holder may be resiliently biased to the position in which the pivot axis 32 is set back from the table distal edge 23 and as the table is depressed into the slot 62, the holder may be moved to the position in which the pivot axis of the holder is adjacent to the distal edge of the table. The table may then latch or be locked into place. In such an arrangement, as the holder would only slide when interacting with the structure 60, the depth of the holder recess may be less than or equal to half of the depth of the recess 21 in the table portion 20.

Although it has been described above that the holder 30 comprises a second weighted portion 36, the holder 30 may additionally or alternatively be maintained in an upright position by virtue of one or more actuators (not shown). Such actuators may act on the shaft portions 33a, 33b. The actuators may be operatively coupled to the above described sensor which may determine the inclination of the table. The actuators may rotate the holder 30 so as to maintain an upright position.

It will be appreciated by those skilled in the art that although representative embodiments have been described by way of example, the claimed subject matter is not limited to the disclosed examples and alternative examples may be constructed without departing from the scope of the appended claims.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A stowable table comprising:
   a table portion movable between a horizontal deployed position and a non-horizontal stowed position; and
   a holder configured to receive a liquid containing receptacle rotatably coupled to the table portion about a pivot axis;
   wherein the holder is slidable between a first position with the pivot axis set back from an end of the table portion in the deployed position and a second position with the pivot axis adjacent to the table portion end in the stowed position, the stowable table configured such that the holder moves from the set back position to the aligned position when the table portion moves from the stowed position to the deployed position.

2. A stowable table comprising:
   a table portion movable between a horizontal deployed position and a non-horizontal stowed position, the table portion being configured to be stowed in a receiving structure; and
   a holder configured to receive a liquid containing receptacle, wherein the holder is rotatably coupled to the table portion about a pivot axis;
   wherein the holder is slidably coupled to the table portion and is slidable between a set back position in which the pivot axis is set back from an end of the table portion when the table portion is in the deployed position and an aligned position in which the pivot axis is adjacent to the table portion end when in the stowed position, and wherein the holder comprises a second weighted portion spaced apart from the pivot axis such that gravity biases the holder into an upright position.

* * * * *